United States Patent
Taniguchi et al.

(10) Patent No.: US 9,265,059 B2
(45) Date of Patent: Feb. 16, 2016

(54) WIRELESS COMMUNICATION SYSTEM

(75) Inventors: Shouhei Taniguchi, Fukuoka (JP); Ryosuke Kitago, Fukuoka (JP); Hirotaka Fukutsuka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 813 days.

(21) Appl. No.: 13/311,744

(22) Filed: Dec. 6, 2011

(65) Prior Publication Data

US 2012/0140747 A1 Jun. 7, 2012

(30) Foreign Application Priority Data

Dec. 6, 2010 (JP) ................................. 2010-271077

(51) Int. Cl.
*H04W 72/12* (2009.01)

(52) U.S. Cl.
CPC ................................. *H04W 72/1247* (2013.01)

(58) Field of Classification Search
CPC ...... H04B 7/2643; H04L 49/25; H04Q 11/04; G06Q 50/12
USPC ........ 370/337, 355, 498; 379/266.01; 705/15; 709/204
See application file for complete search history.

(56) References Cited

U.S. PATENT DOCUMENTS

| 4,378,598 A * | 3/1983 | Ludikar .......................... 370/498 |
| 7,092,509 B1 * | 8/2006 | Mears et al. .............. 379/266.01 |
| 2005/0049921 A1 * | 3/2005 | Tengler et al. ................... 705/15 |
| 2006/0253532 A1 * | 11/2006 | Kukoleca ...................... 709/204 |
| 2010/0046510 A1 * | 2/2010 | Koster et al. ................... 370/355 |
| 2010/0250374 A1 * | 9/2010 | Downes .......................... 705/15 |

FOREIGN PATENT DOCUMENTS

| JP | 2002-335329 A | 11/2002 |
| JP | 2003-070053 A | 3/2003 |
| JP | 2005-057643 A | 3/2005 |
| JP | 2009-253821 A | 10/2009 |

\* cited by examiner

*Primary Examiner* — Andrew Lai
*Assistant Examiner* — Chuong M Nguyen
(74) *Attorney, Agent, or Firm* — Pearne & Gordon LLP (57) ABSTRACT

The wireless communication system of the present invention has a first communication mode in which a center module preferentially allocates a slot to communication data of a calling sub station according to a priority of the calling sub station, and a second communication mode in which the center module allocates the slot to the communication data received from the calling sub station irrespective of the priority of the calling sub station. The center module determines which sub station can make a call to which sub station, each sub station transmits identification information to the center module, and the center module identifies the transmitting sub station based on the identification information, determines which sub station the identified sub station can make a call to, and allocates the slot to communication between the sub station determined to be capable of making a call and the transmitting sub station.

13 Claims, 10 Drawing Sheets

TALK MODE

| CALLING SUB STATION / RECEIVING SUB STATION | MG | SMG | CL1 | CL2 | TEL | KTN | DRT |
|---|---|---|---|---|---|---|---|
| MG | — | × | × | × | O/× | × | O/× |
| SMG | × | — | × | × | O/× | × | O/× |
| CL1 | × | × | — | × | O/× | × | O/× |
| CL2 | × | × | × | — | O/× | × | O/× |
| TEL | O/× | O/× | O/× | O/× | — | O/× | × |
| KTN | O/× | O/× | O/× | O/× | O/× | — | O/× |
| DRT | — | — | — | — | — | — | — |

Fig.9

PAGE MODE

| CALLING SUB STATION / RECEIVING SUB STATION | MG | SMG | CL1 | CL2 | TEL | KTN | DRT |
|---|---|---|---|---|---|---|---|
| MG | — | O | × | × | × | × | × |
| SMG | O | — | × | × | × | × | × |
| CL1 | O | O | — | × | O/× | O/× | O/× |
| CL2 | O | O | × | — | O/× | O/× | O/× |
| TEL | × | × | O/× | O/× | — | O/× | × |
| KTN | O | O | O/× | O/× | O/× | — | O/× |
| DRT | — | — | — | — | — | — | — |

Fig.10

(a) TALK MODE

CL1 | CNTL | AVAILABLE | DOWNLINK CL1 | DOWNLINK CL2 | AVAILABLE | UPLINK CL1 | UPLINK CL2
CL2

CHANNEL 1 IN USE (f1MHz)

(b) PAGE MODE

MQ | CNTL | DOWNLINK MG | DOWNLINK CL1 | DOWNLINK CL2 | AVAILABLE | UPLINK CL1 | UPLINK CL2
CL1
CL2

CHANNEL 1 IN USE (f1MHz)

WIRELESS COMMUNICATION SYSTEM

BACKGROUND OF THE INVENTION

1. Technical Field

The present invention relates to a wireless communication system in which a plurality of sub stations wirelessly communicate with each other via a center module.

2. Background Art

Figure 11:
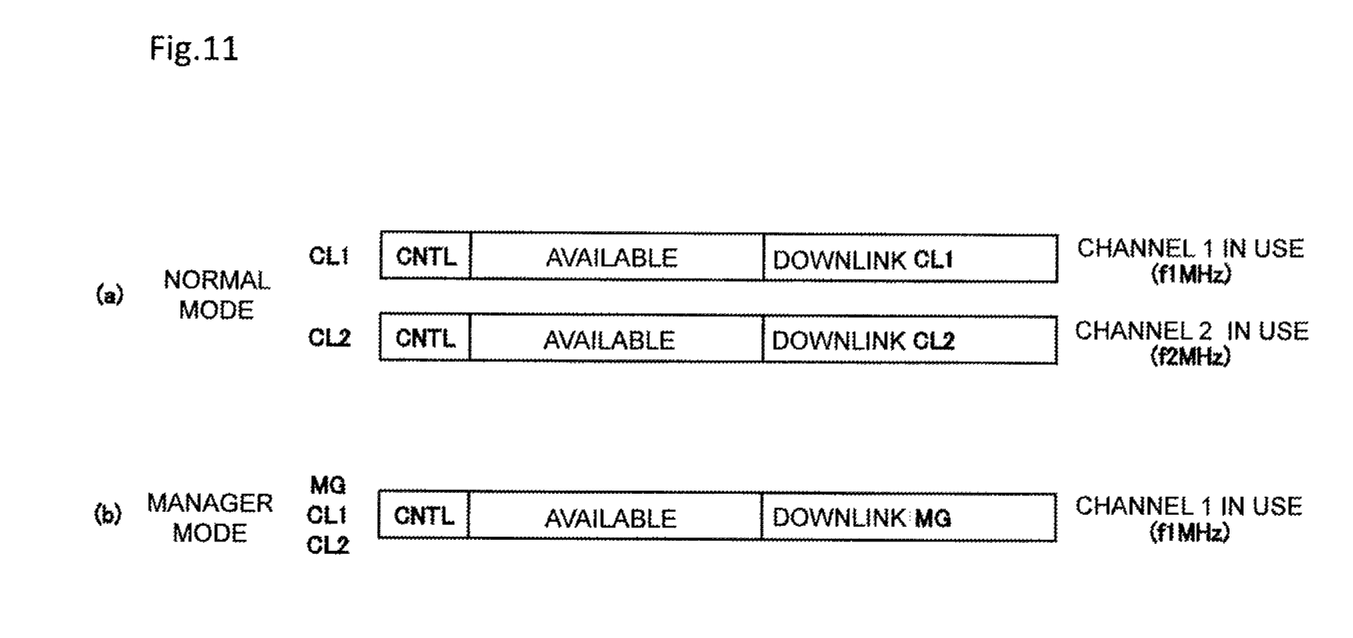

FIG. 11 is a diagram showing a packet configuration for communication in a conventional wireless communication system. Referring to FIG. 11, a normal mode and a manager mode in the conventional wireless communication system will be described. FIG. 11 (a) shows a packet configuration in a normal mode. FIG. 11 (b) shows a packet configuration in the manager mode. In any mode, packet communication is performed using a time division duplex (TDD) scheme. It is provided that the number of available channels (the number of frequency bands) is two.

In an example in FIG. 11 (a), each of a store personnel 1 and a store personnel 2 communicates with a kitchen in the normal mode. A channel 1 (f1 MHz) is allocated to the communication by the store personnel 1. A channel 2 (f2 MHz) is allocated to the communication by the store personnel 2. FIG. 11 (a) shows a state in which all the prepared two channels are used by the store personnel.

In such a situation, when a manager wishes to urgently call staff members, the manager operates a center module to set the communication mode to the manager mode. After the wireless communication system is set to the manager mode, the communication by the store personnel 1 is forcedly terminated and downlink slots having been used by the store personnel 1 is exclusively used by the manager as shown in FIG. 11 (b). Likewise, the communication by the store personnel 2 having been performed using the channel 2 is forcedly terminated, and the channel 2 having been used by the store personnel 2 is forcedly switched to the channel 1.

In such a conventional communication system, when the communication mode is set to the manager mode, the call by the manager exclusively uses the channel in a forced manner in order to secure the urgent call from the manager. Accordingly, if the communication mode is switched to the manager mode while the store personnel is communicating with the kitchen in the normal mode, the communication from the store personnel to the kitchen is forcedly terminated. Further, during the manager mode is selected, another staff member cannot make a call.

SUMMARY OF INVENTION

It is an object of the present invention to provide a highly useful wireless communication system.

The wireless communication system of the present invention includes a center module and a plurality of sub stations. The sub stations communicate with each other via the center module using a time division scheme. In the system, the wireless communication system has a first communication mode in which the center module preferentially allocates a slot to communication data of the calling sub station according to a priority of the calling sub station, and a second communication mode in which the center module allocates the slot to the communication data received from the calling sub station irrespective of the priority of the calling sub station, the center module determines which sub station can make a call to which sub station, each of the sub stations transmits identification information identifying itself along with the communication data to the center module, and the center module identifies the transmitting sub station based on the identification information from the sub station, determines which sub station the identified sub station can make a call to, and allocates the slot to communication between the sub station having been determined to be capable of making a call and the transmitting sub station.

BRIEF DESCRIPTION OF DRAWINGS

FIG. 10 (a) is a diagram showing a packet configuration for the TALK mode in a wireless communication system of the embodiment of the present invention;

FIG. 10 (b) is a diagram showing a packet configuration for the PAGE mode in the wireless communication system of the embodiment of the present invention;

FIG. 11 (a) is a diagram showing a packet configuration for a normal mode in a conventional wireless communication system; and FIG. 11 (b) is a diagram showing a packet configuration for a manager mode in the conventional wireless communication system.

DETAILED DESCRIPTION OF THE PREFERRED EMBODIMENT

An embodiment of the present invention will hereinafter be described in detail with reference to drawings.

Figure 1:
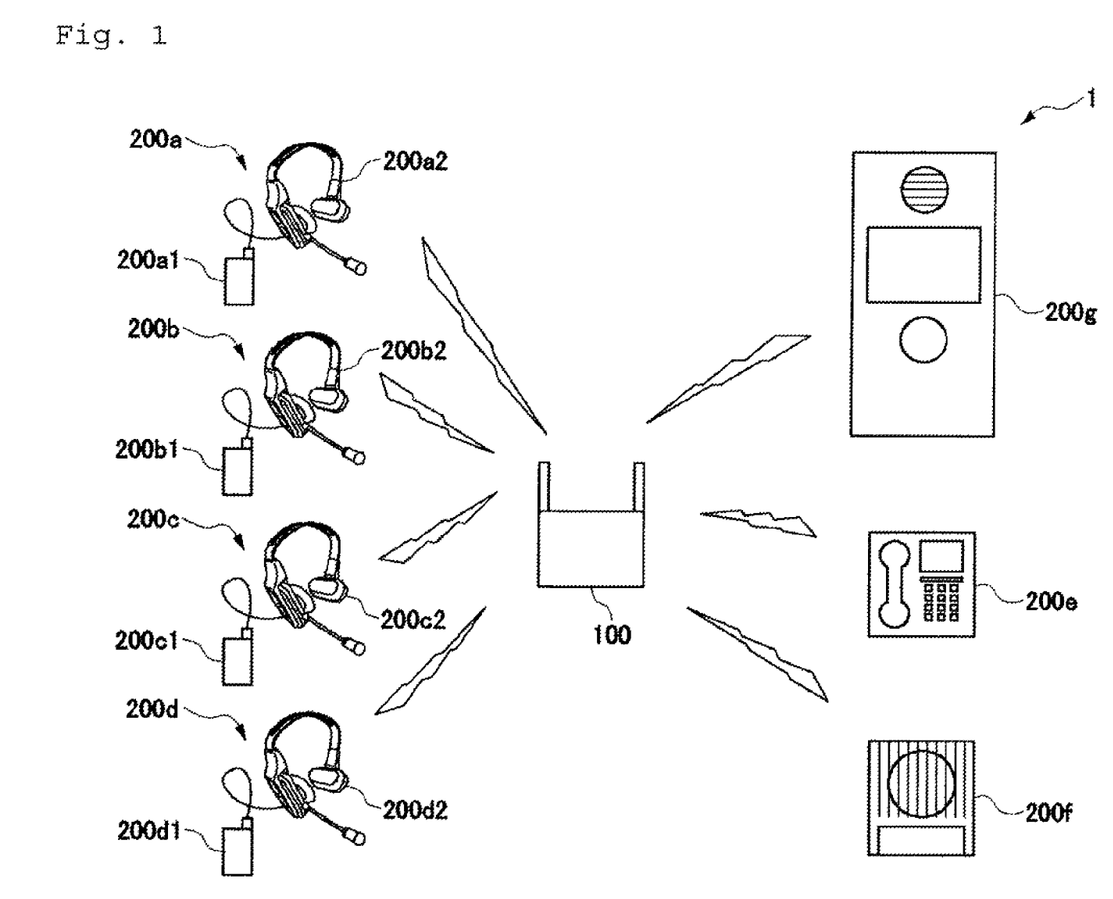
FIG. 1 is a diagram showing an overall configuration of a wireless communication system of an embodiment of the present invention.

FIG. 1 is a diagram showing a configuration of a wireless communication system of the embodiment of the present invention.

In FIG. 1, the wireless communication system of this embodiment includes a plurality of sub stations and a center module. Each sub station wirelessly communicates with another sub station via the center module. This system allows communication from each sub station to only one of the other sub stations, and broadcast communication (multicasting) from each sub station to a plural number of the other sub stations. Such a wireless communication system is applied as, for instance, a wireless communication system in a restaurant. Hereinafter, a case will be described where the wireless communication system is employed in a restaurant, particularly, in a quick service restaurant having a drive-thru system.

In the case where this type of the wireless communication system is employed in the quick service restaurant, the center module is installed at an appropriate place in the restaurant (e.g. in the vicinity of an order counter). The sub stations include sub stations as mobile intercoms carried by staff members including a manager, a sub-manager and store personnel; a sub station as a part of a drive-thru system including a confirmation order display (COD); a sub station connected to a telephone; and a sub station installed in a kitchen.

The wireless communication system has communication modes, which are a normal mode and a manager mode. In the normal mode, a channel is allocated to a calling sub station for every time. In a case where a plurality of channels are provided, a plurality of sub stations can communicate at the same time. For instance, a plurality of store personnel can communicate with the kitchen.

In the normal mode, even in a case where the manager wishes to urgently communicate with the other staff members, when all the provided channels have already been used for communication by the other sub stations and no channel is allocatable, an urgent call from the manager to the other staff members cannot be made.

In the manager mode, even in a case where the other staff members are in communication, audio is forcedly switched to the manager's, which prevents the other sub stations from communicating and allows the audio of the manager to be unilaterally broadcast (multicast) to the other sub stations. Accordingly, in the manager mode, the manager is capable of securely transmitting an urgent communication to the other staff members.

Further, the wireless communication system of this embodiment is described using an example of a case of being used in a restaurant, particularly a quick service restaurant having a drive-thru system. However, the wireless communication system of the present invention is applicable not only to the restaurant but also to the other situations, such as for instance an amusement facility, or a disaster relief scene.

In FIG. 1, the wireless communication system 1 includes a center module 100 and a plurality of sub stations 200a to 200g. Communication data is wirelessly transmitted and received between the center module 100 and each of the sub stations 200a to 200g. That is, wireless communication between the sub stations 200a to 200g is performed via the center module 100. The center module 100 is installed at a place where wireless radio waves from the sub stations 200a to 200g reach. For instance, in the quick service restaurant, the center module 100 is installed in the vicinity of the order counter.

Four sub stations 200a to 200d shown in FIG. 1 (left side) are mobile intercoms including sub station main bodies 200a1 to 200d1 and headsets 200a2 to 200d2. The sub station main bodies 200a1 to 200d1 are inserted in holders and worn by respective users on their waists. Each of the headsets 200a2 to 200d2 has a configuration capable of being worn on the head of the user, and includes a speaker (earphones) and a microphone. The sub station 200a is a sub station for the manager. The sub station 200b is a sub station for the sub-manager. The sub station 200c is a sub station for the store personnel 1. The sub station 200d is a sub station for the store personnel 2.

The sub station 200e is a sub station for an outside line. The sub station 200e for an outside line is connected to a telephone. The sub station 200e for an outside line inputs audio received from another sub station into the telephone in order to transmit the audio to the opposite party of the telephone. The sub station 200e for an outside line captures, from the telephone, audio received by the telephone from the opposite party of the telephone, and transmits the audio to another sub station. The sub station 200e for an outside line may be embedded in the telephone.

The sub station 200f is a sub station for the kitchen. In contrast to the sub stations 200a to 200d of the other staff members, the sub station 200f is installed at an appropriate place in the kitchen. This is because it is not preferable that a staff member in the kitchen wear a headset in view of sanitary. The sub station 200f may have a configuration including the outside speaker and the microphone. Instead, this unit may have a configuration (only with audio output) that includes the outside speaker but does not include the microphone.

The sub station 200g is a sub station for drive-thru. The sub station 200g for drive-thru is a part of a drive-thru system, and installed at a place for drive-thru service (order) outside of the store such that a drive-thru user can input speech through the microphone. In the description of this embodiment, the drive-thru system includes a confirmation order display, a camera, a outside speaker and a vehicle sensor.

Hereinafter, referring to FIGS. 2 to 6, respective configurations of the sub stations 200a to 200g will be described. In the description of the sub stations 200a to 200g, identical configurational elements are allocated with identical symbols, and redundant description is appropriately omitted.

Figure 2:
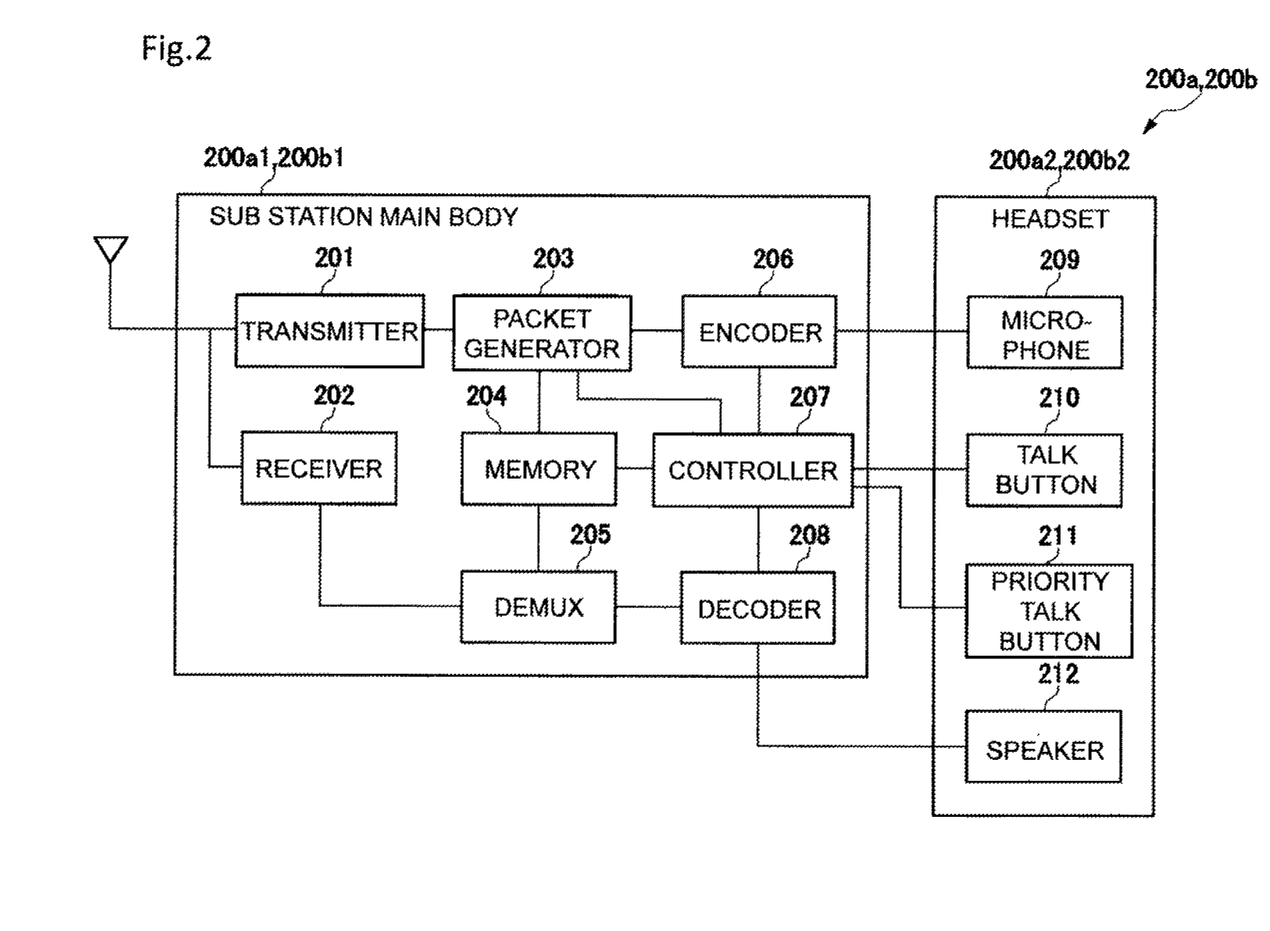
FIG. 2 is a diagram showing a configuration of each of a sub station for a manager and a sub station for a sub-manager in the embodiment of the present invention.

FIG. 2 is a diagram showing the configuration of each of the sub station for the manager and the sub station for the sub-manager in the embodiment of the present invention. The sub station 200a for the manager and the sub station 200b for the sub-manager have the identical configuration. The sub station 200a for the manager and the sub station 200b for the sub-manager include sub station main bodies 200a1 and 200b1, and headsets 200a2 and 200b2, respectively; the main body and the headset are connected to each other.

The sub station main bodies 200a1 and 200b1 include a transmitter 201, a receiver 202, a packet generator 203, a memory 204, a demultiplexer 205, an encoder 206, a controller 207 and a decoder 208. The headsets 200a2 and 200b2 include a microphone 209, a talk button 210, a priority talk button 211 and a speaker (earphones) 212.

The sub stations 200a and 200b can communicate in a state where the talk button 210 or the priority talk button 211 is turned on. The talk button 210 and the priority talk button 211 may be configured such that, when one of the buttons is on, the other is off and thus both the buttons are not turned on at the same time. Instead, the buttons may be configured such that both the buttons can be turned on at the same time. The talk button 210 or the priority talk button 211 may be configured such that the on-state is maintained only during the user manually presses the button, and the state is turned off when the user releases the hand from the button. The buttons may be configured such that the on-state is established once the user operates, and the on-state is maintained until the user performs an operation of turning the button off.

The talk button 210 and the priority talk button 211 output a signal indicating the on-state, to the controller 207. The controller 207 performs control for communication when any of the talk button 210 and the priority talk button 211 is on. The controller 207 outputs, to the packet generator 203, button state information indicating the on/off-state of the talk button 210 and the on/off-state of the priority talk button 211. The memory 204 stores its own ID information.

The microphone 209 converts the audio of the user into an electric signal. The encoder 206 encodes the audio input through the microphone 209 and generates audio data. The packet generator 203 generates packets of communication data that includes the encoded audio data and control data. The control data includes identification information (hereinafter, referred to as ID information) that has been read from the memory 204 and identifies the unit itself, and button state information (information of the on/off-state of the talk button 210 and the on/off-state of the priority talk button 211). The transmitter 201 transmits the packets of the generated communication data.

The receiver 202 receives the communication data transmitted from the center module 100 and reproduces the data. As will be described later, the center module 100 wirelessly communicates with the sub stations 200a to 200g by means of the packets of the communication data using the time division multiple access/time division duplex (TDMA/TDD) scheme. The demultiplexer (DEMUX) 205 refers to the own ID information of the unit stored in the memory 204, picks up packets that are destined for the own unit and included in the received communication data (packets where the ID information designated as the destination matches with the own ID information of the unit), and outputs the packets to the decoder 208. The decoder 208 decodes the communication data, and outputs the control data and the audio data to the controller 207 and the speaker 212, respectively. The speaker 212 converts the audio data into audio and outputs the audio.

Figure 3:
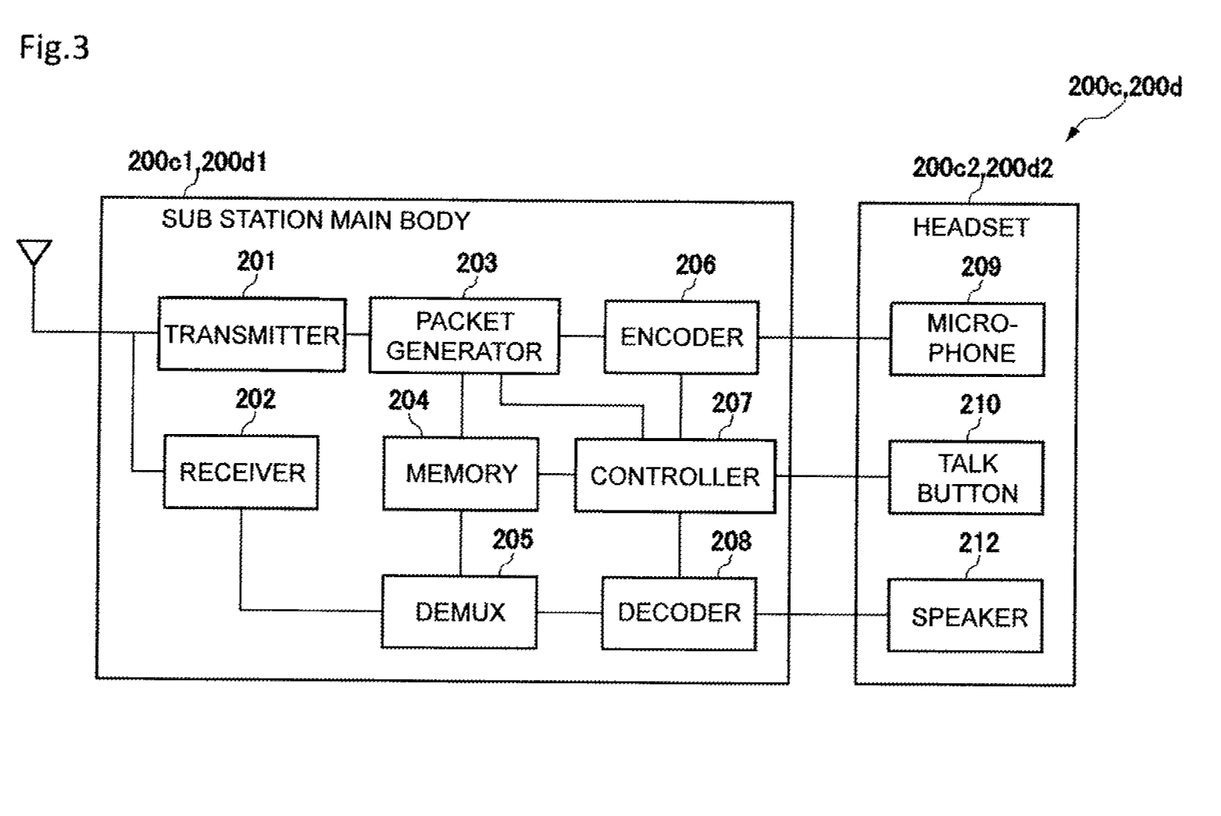
FIG. 3 is a diagram showing a configuration of a sub station for a store personnel in the embodiment of the present invention.

FIG. 3 is a diagram showing the configuration of each of the sub station for the store personnel 1 and the sub station for the store personnel 2 in the embodiment of the present invention. As with the sub station 200a for the manager and the sub station 200b for the sub-manager, the sub station 200c for the store personnel 1 and the sub station 200d for the store personnel 2 include sub station main bodies 200c1 and 200d1 and headsets 200c1 and 200d2. The sub station 200c for the store personnel 1 and sub station 200d for the store personnel 2 have the identical configuration.

In contrast to the sub station 200a for the manager and the sub station 200b for the sub-manager, the sub station 200c for the store personnel 1 and the sub station 200d for the store personnel 2 do not include the priority talk button 211. As will be described later, this is because the sub station 200c for the store personnel 1 and the sub station 200d for the store personnel 2 are not allowed to perform a priority communication. The other configurations of the sub station 200c for the store personnel 1 and the sub station 200d for the store personnel 2 are identical to the corresponding configurations of the sub station 200a for the manager and the sub station 200b for the sub-manager.

Figure 4:
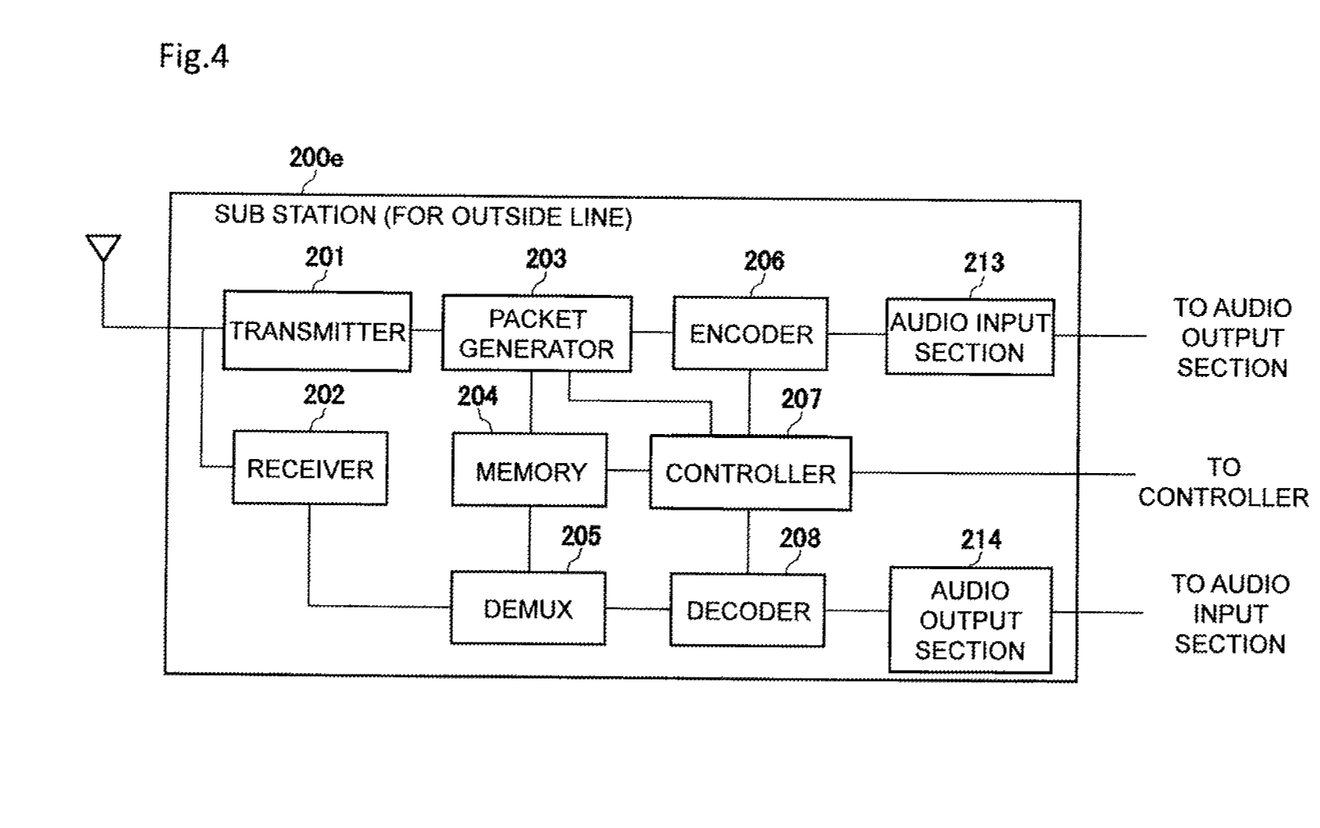
FIG. 4 is a diagram showing a configuration of a sub station for an outside line in the embodiment of the present invention.

FIG. 4 is a diagram showing the configuration of the sub station for an outside line in the embodiment of the present invention. In contrast to the aforementioned sub stations 200a to 200d, the sub station 200e for an outside line is not separated into the sub station main body and the headset but has an integrated configuration. Components of this sub station are substantially identical to the components of the sub stations 200a to 200d. However, this sub station does not include the talk button 210 and the priority talk button 211. This sub station includes an audio input section 213 instead of the microphone 209, and further includes an audio output section 214 instead of the speaker 212.

The audio input section 213 is connected to an audio output section of the telephone, and receives audio from the opposite party of the external line that has been output through an audio output section of the telephone. The audio output section 214 is connected to the audio output section of the telephone, and outputs the audio data decoded by the decoder 208 to the audio input section of the telephone. The controller 207 is connected to a controller of the telephone.

On an incoming external call, the controller 207 may control the controller of the telephone to receive the external call and start control of the encoder 206 and the decoder 208. Instead, the controller of the telephone may notify the controller 207 of the reception of the external call, and, responsive to the notification, the controller 207 may start control of the encoder 206 and the decoder 208. The other configuration of the sub station 200e for an outside line is identical to the corresponding configurations of the sub stations 200a to 200d. FIG. 4 shows the sub station 200e for an outside line that is connected to the telephone. However, the sub station 200e for an outside line may be embedded in the telephone, as described above.

Figure 5:
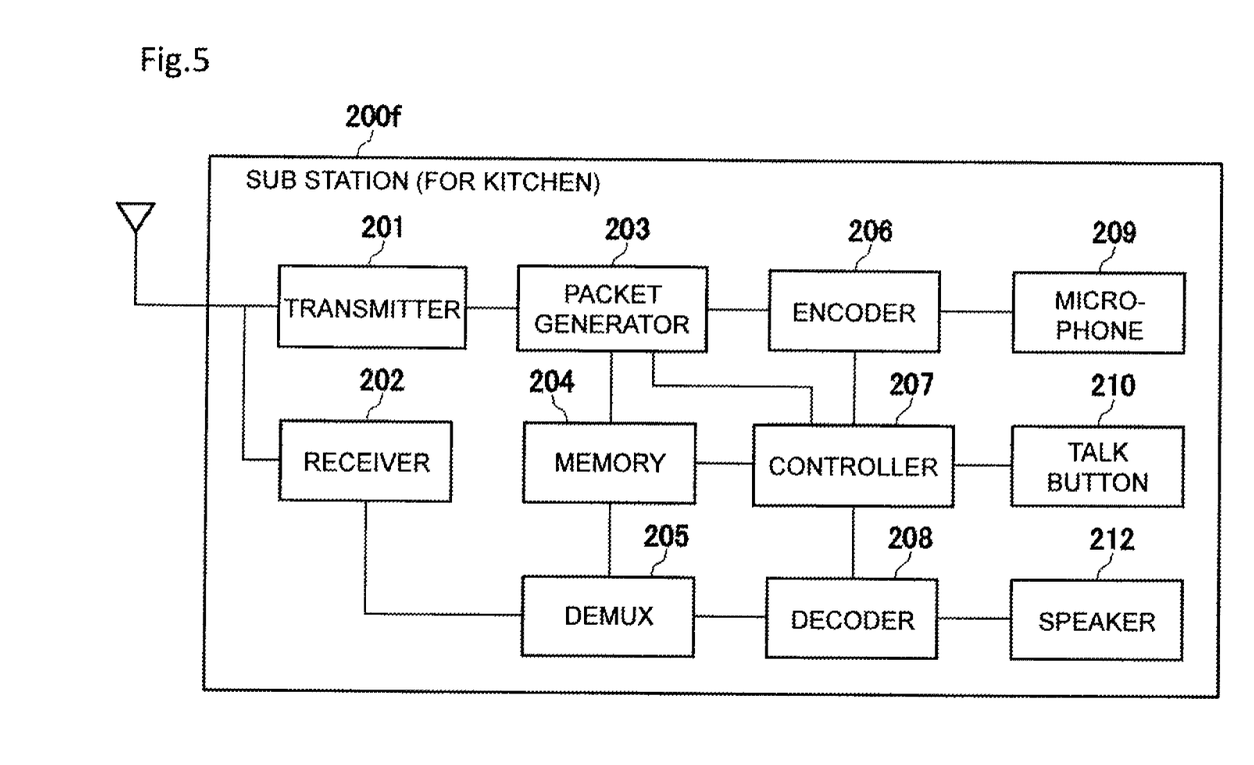
FIG. 5 is a diagram showing a configuration of a sub station for the kitchen in the embodiment of the present invention.

FIG. 5 is a diagram showing the configuration of the sub station for the kitchen in the embodiment of the present invention. The sub station 200f for the kitchen is also has an integrated configuration as with the sub station 200e for an outside line. Components of the sub station 200f for the kitchen are identical to the components of the sub station 200c for the store personnel 1 and the sub station 200d for the store personnel 2. As described above, the sub station 200f for the kitchen does not necessarily include a function of inputting speech of the staff member in the kitchen. In this case, the configuration of the talk button 210, the microphone 209, the encoder 206, the packet generator 203 and the transmitter 201 can be omitted.

Figure 6:
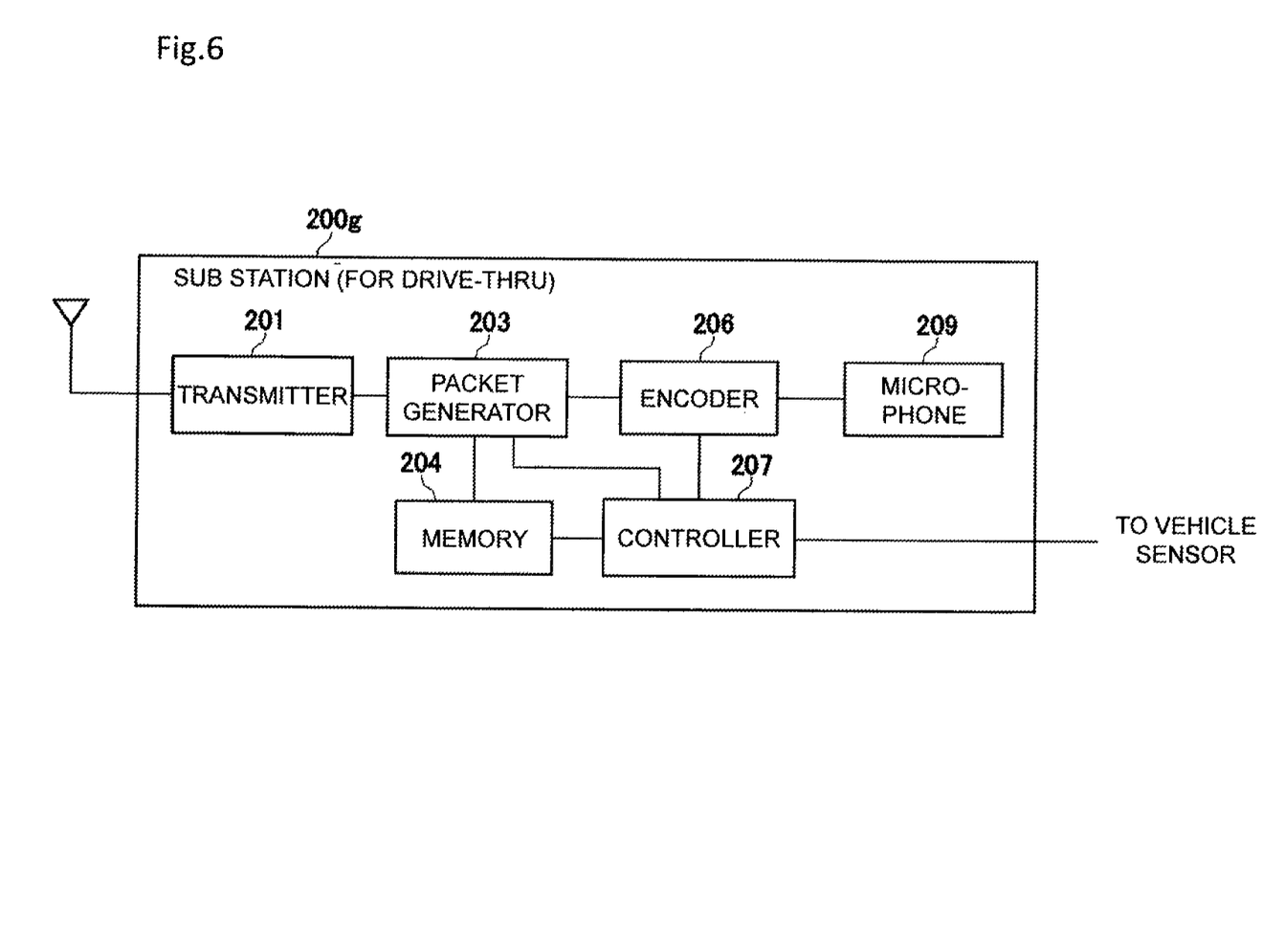
FIG. 6 is a diagram showing a configuration of a sub station for drive-thru in the embodiment of the present invention.

FIG. 6 is a diagram showing the configuration of the sub station for drive-thru in the embodiment of the present invention. The sub station 200g for drive-thru includes a transmitter 201, a packet generator 203, a memory 204, an encoder 206, a controller 207 and a microphone 209. The sub station 200g for drive-thru does not include an audio output function.

Further, the sub station 200g for drive-thru does not include the talk button 210. The controller 207 is connected with a vehicle sensor of the drive-thru system. When the vehicle sensor of the drive-thru system detects a vehicle, a detection signal is transmitted to the controller 207, and the controller 207 activates an audio input function of the microphone 209, encoder 206 and the like based on the detection signal.

The drive-thru system may include a microphone used by a store personnel in the store who serves a drive-thru user, and a outside speaker that is connected to the microphone and dedicated for the drive-thru user. Note that the microphone and the outside speaker are not configured as a part of the wireless communication system 1, but configured as a system other than wireless communication system 1. This is because the system is not necessarily configured such that any of staff members including the manager and the staff member at the kitchen can communicate with a drive-thru user. Note that the wireless communication system 1 includes the sub station 200g for drive-thru so that not only the store personnel directly serving the drive-thru user but also the other staff members including the staff member of the kitchen are capable of hearing the audio of the drive-thru user through use of the wireless communication system 1.

Figure 7:
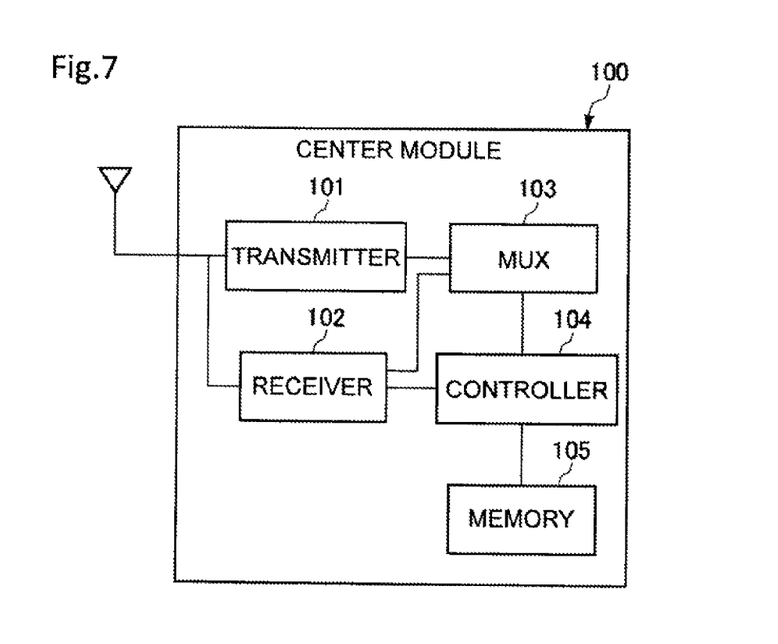
FIG. 7 is a diagram showing a configuration of a center module in the embodiment of the present invention.

FIG. 7 is a diagram showing the configuration of the center module in the embodiment of the present invention. The center module 100 includes the transmitter 101, the receiver 102, the multiplexer 103, the controller 104 and the memory 105. The receiver 102 receives communication data wirelessly transmitted from the sub stations 200a to 200g. As described above, the communication data transmitted from the sub stations 200a to 200g includes audio data and control data.

The control data in the communication data transmitted from the sub station 200a for the manager and the sub station 200b for the sub-manager includes button state information that indicates on/off-states of the talk button 210 and the priority talk button 211. The controller 204 receives the control information and sets the communication mode responsive to the on/off-state of the priority talk button 211. The communication mode includes a TALK mode and a PAGE mode.

The memory 105 stores audio routing tables for the TALK mode and the PAGE mode. The controller 104 reads from the memory 105 the audio routing table corresponding to the set communication mode, and controls the multiplexer 103 responsive to the read audio routing table.

The multiplexer 103 generates communication data to be transmitted to each sub station using the audio data in the communication data received by the receiver 102, according to control by the controller 104. The multiplexer 103 allocates the packet of the audio data received by the receiver 102 from the sub stations 200a to 200g to an audio slot in one channel, for the sake of wireless communication between the center module 100 and the sub stations 200a to 200g using the time division multiple access/time division duplex (TDMA/TDD) scheme. The transmitter 101 transmits the packets of the communication data generated by the multiplexer 103.

The TALK mode and the PAGE mode set by the center module 100 will hereinafter be described. The TALK mode is a mode in which the sub stations 200a to 200g can freely communicate using an available slot. The PAGE mode is a mode in which the sub stations 200a and 200b for the manager and the sub-manager as the specific sub stations can preferentially secure a slot and the other sub stations as general sub stations can freely communicate using an available slot. The TALK mode corresponds to a "second communication mode" of the present invention. The PAGE mode corresponds to a "first communication mode" of the present invention.

Typically, sub stations communicate with each other in the TALK mode. When the priority talk button 211 of the sub station 200a for the manager or the sub station 200b for the sub-manager is turned on, the communication mode is switched from the TALK mode to the PAGE mode. More specifically, when priority talk button 211 of the sub station 200a for the manager or the sub station 200b for the sub-manager is turned on, the controller 207 outputs to the packet generator 203 the button state information indicating that the priority talk button 211 is on as a designation for the priority communication; the packet generator 203 generates packets of communication data including the button state information indicating that the priority talk button 211 is on; transmitter 201 transmits the packets of the generated communication data.

In the center module 100, the receiver 102 receives the communication data, and outputs the control data to the controller 104. If the control data includes the button state information indicating that the priority talk button 211 is on, the controller 104 switches the communication mode from the TALK mode to the PAGE mode. The controller 104 reads from the memory 105 the audio routing table corresponding to the communication mode in each of the TALK mode and the PAGE mode, and controls the multiplexer 103 to generate communication data according to the read table.

Figure 8:
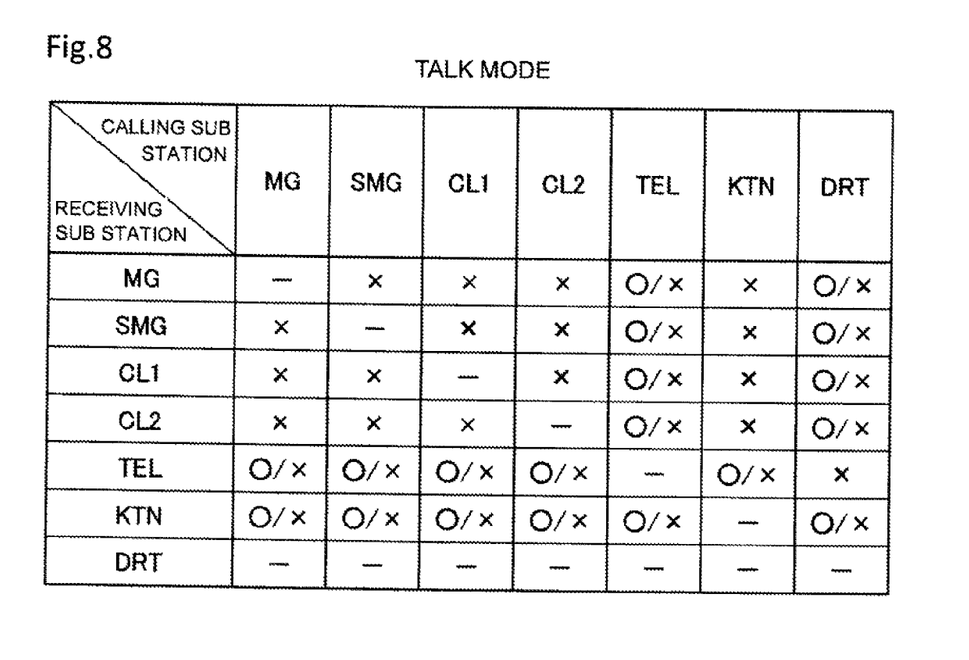
FIG. 8 is a diagram showing a audio routing table for a TALK mode in the embodiment of the present invention.
Figure 9:
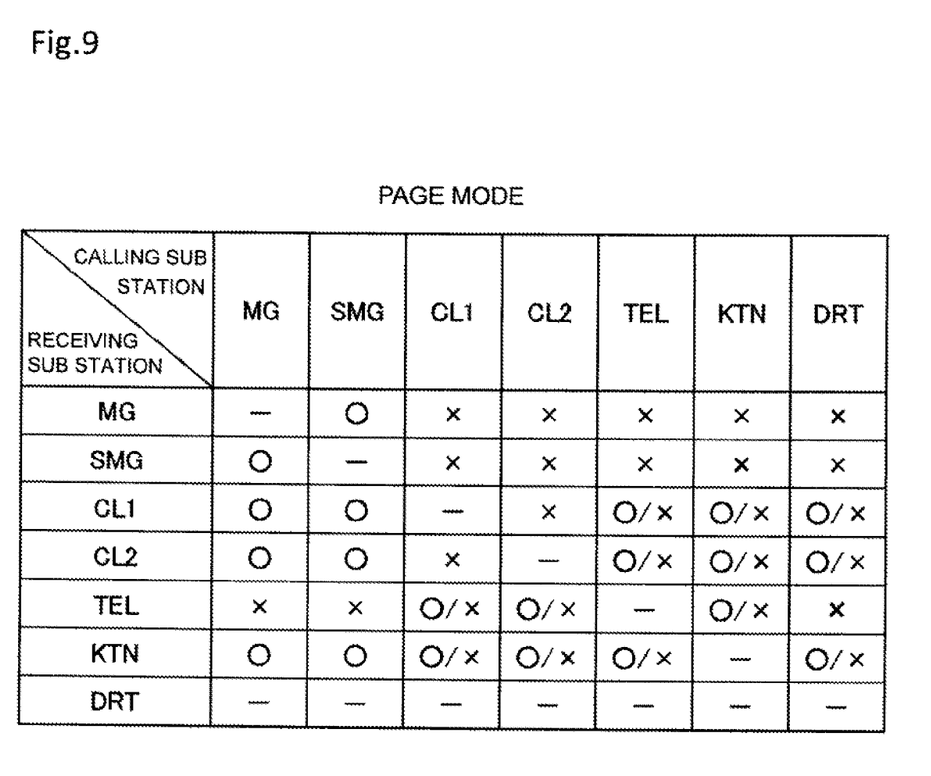
FIG. 9 is a diagram showing a audio routing table for a PAGE mode in the embodiment of the present invention.

FIG. 8 is a diagram showing the audio routing table for the TALK mode in the embodiment of the present invention. FIG. 9 is a diagram showing the audio routing table for the PAGE mode in the embodiment of the present invention. The audio routing table specifies which calling sub station can call which receiving sub station. Which calling sub station can call which receiving sub station is different according to attributes of the calling and receiving sub stations.

The attribute indicates that each calling sub station belongs to a group among MG, SMG, CL1, CL2, TEL, KTN and DRT groups. The center module 100 manages which calling sub station can call which receiving sub station, according to the attributes of the sub stations. The attribute of the sub station is determined based on the ID information of the calling sub station that is included in the control data.

In FIGS. 8 and 9, symbol "○" indicates that the communication data transmitted from the calling sub station can preferentially be output at the receiving sub station. Symbol "X" indicates that the communication data transmitted from the calling sub station is not output at the receiving sub station. Symbol "-" indicates that the own communication data is not output, or the receiving sub station does not have an audio output function (i.e. the communication data transmitted from the calling sub station is not output at the receiving sub station). Symbol "○/X" indicates that, when a calling trigger is activated in the calling sub station, the communication data transmitted from the calling sub station is output at the receiving sub station. The calling trigger means that the talk button 210 is turned on, in the sub station 200a for the manager, the sub station 200b for the sub-manager, the sub station 200c for the store personnel 1, the sub station 200d for the store personnel 2 and the sub station 200f for the kitchen. The calling trigger means that an incoming external call is received, in the sub station 200e for an outside line. The calling trigger means that the signal indicating detection of a vehicle is received from the vehicle sensor of the drive-thru system, in the sub station 200g for drive-thru.

As shown in FIG. 8, in the TALK mode, with the talk button 210 being in the on-state, the communication data transmitted from the sub station 200a for the manager (MG), the sub station 200b for the sub-manager (SMG), the sub station 200c for the store personnel 1 (CL1) and the sub station 200d for the store personnel 2 (CL2) can be output at the sub station 200e for an outside line (TEL) and the sub station 200f for the kitchen (KTN). The communication data transmitted in a state where the sub station 200e for an outside line (TEL) is receiving an external line can be output at the sub stations other than the sub station 200e for an outside line (TEL) and the sub station 200g for drive-thru (DRT).

The communication data transmitted from the sub station 200f for the kitchen (KTN) with the talk button 210 being in the on-state can be output at the sub station 200e for an outside line (TEL). The communication data transmitted from the sub station 200g for drive-thru (DRT) in a state where the vehicle sensor detects the vehicle can be output at the units other than the sub station for an outside line 200f (KTN) and the sub station 200g for drive-thru (DRT).

As shown in FIG. 9, in the PAGE mode, the communication data transmitted from the sub station 200a for the manager (MG) is output at the sub station 200b for the sub-manager (SMG), the sub station 200c for the store personnel 1 (CL1), the sub station for the store personnel 2 (CL2) and the sub station 200f for the kitchen (KTN). The communication data transmitted from the sub station 200b for the sub-manager (SMG) is output at the sub station 200a for the manager (MG), the sub station 200c for the store personnel 1 (CL1), the sub station for the store personnel 2 (CL2) and the sub station 200f for the kitchen (KTN).

In the PAGE mode, the sub station 200c for the store personnel 1 (CL1) and the sub station 200d for the store personnel 2 (CL2) can make a call with the talk button 210 being turned on, thereby allowing the communication data to be output at the sub station 200e for an outside line (TEL) and the sub station 200f for the kitchen (KTN). When an incoming external call is received, the communication data transmitted from the sub station 200e for an outside line (TEL) can be output at the sub station 200c for the store personnel 1 (CL1), the sub station 200d for the store personnel 2 (CL2) and the sub station 200f for the kitchen (KTN).

Further, the sub station 200*f* for the kitchen (KTN) can make a call with the talk button 210 being turned on, thereby allowing the communication data to be output at the sub station 200*c* for the store personnel 1 (CL1), the sub station 200*d* for the store personnel 2 (CL2) and the sub station 200*e* for an outside line (TEL). When the vehicle sensor in the drive-thru system detects a vehicle, the communication data transmitted from the sub station 200*g* for drive-thru (DRT) can be output at the sub station 200*c* for the store personnel 1 (CL1), the sub station 200*d* for the store personnel 2 (CL2) and the sub station 200*f* for the kitchen (KTN).

Figure 10:
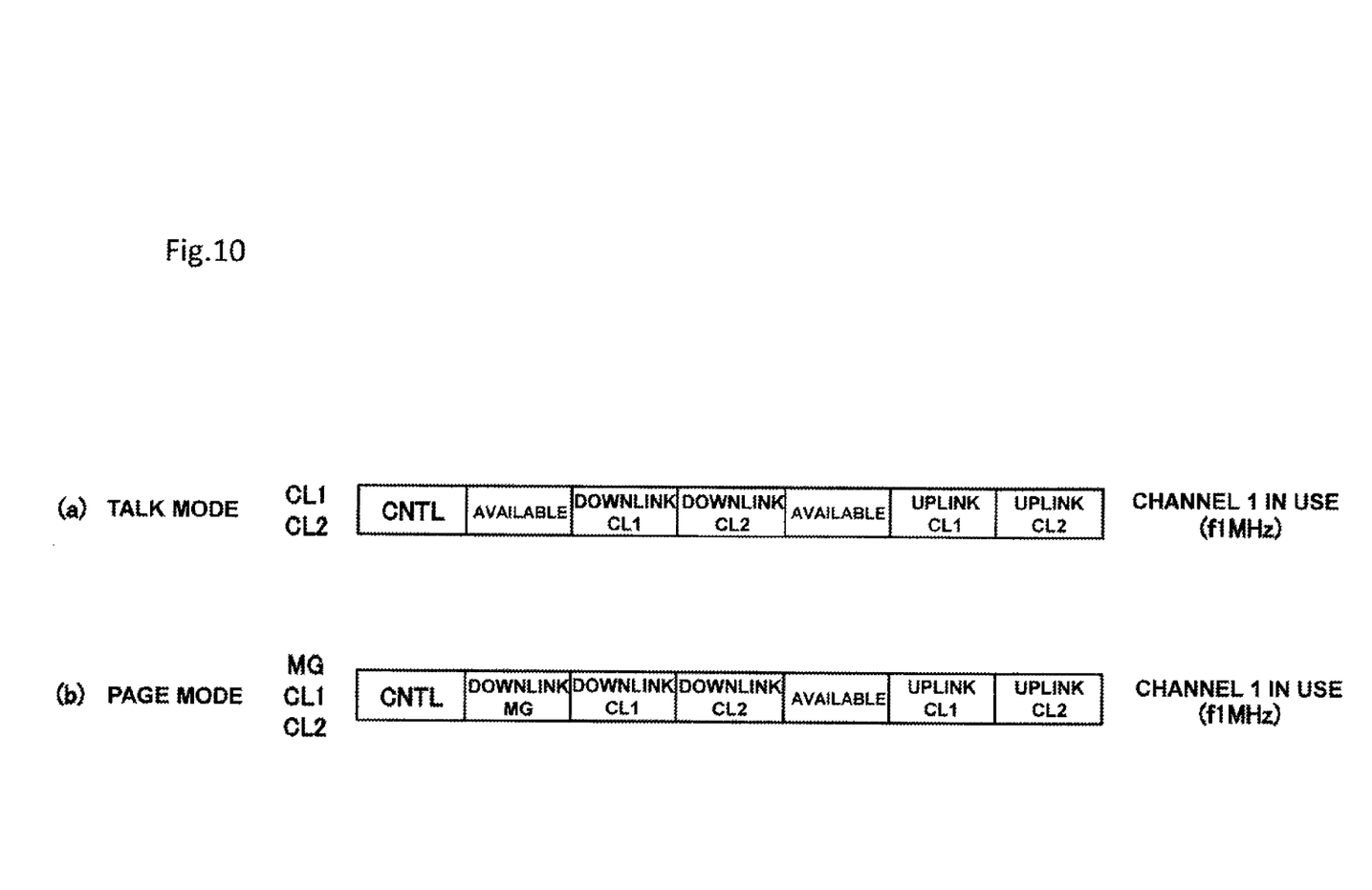

FIGS. 10 (*a*) and 10 (*b*) are diagrams showing packet configurations of the embodiment of the present invention. FIG. 10 (*a*) shows the packet configuration in the case of the TALK mode. FIG. 10 (*b*) shows the packet configuration in the PAGE mode. As described above, in the wireless communication system 1 of this embodiment, the communication data is transmitted and received between the center module, 100 and the sub stations 200*a* to 200*g* using the time division multiple access/time division duplex scheme.

An example shown in FIG. 10 (*a*) shows a case where the store personnel 1 and the store personnel 2 communicate with the kitchen at the same time. As shown in FIG. 10 (*a*), in the TALK mode, audio slots among slots formed by time-dividing one channel (channel 1) are allocated to uplink communication data from the sub station 200*c* for the store personnel 1 to the center module 100, the uplink communication data from the sub station 200*d* for the store personnel 2 to the center module 100, the downlink communication data from the center module 100 to the sub station 200*c* for the store personnel 1, and the downlink communication data from the center module 100 to sub station 200*d* for the store personnel 2. Control slots are allocated to the control data. The audio slots not in use are available, and used in a case where another sub station newly makes a call.

In the TALK mode, the priorities for securing audio slots are identical among all the sub stations. For instance, as shown in FIG. 8, in the TALK mode, the sub station 200*a* for the manager and the sub station 200*b* for the sub-manager can call another sub station in a condition identical to the conditions of the sub station 200*c* for the store personnel 1 and the sub station 200*d* for the store personnel 2. That is, the priorities for securing audio slots for the sub station 200*a* for the manager and the sub station 200*b* for the sub-manager are identical to the priorities for the sub station 200*c* for the store personnel 1 and the sub station 200*d* for the store personnel 2. This means that, in the TALK mode, even the sub station 200*a* for the manager or the sub station 200*b* for the sub-manager cannot make a call unless a slot is available.

FIG. 10 (*b*) shows a state where the TALK mode shown in FIG. 10 (*a*) is switched to the PAGE mode by turning on the priority talk button 211 at the sub station 200*a* for the manager. As shown in FIG. 10 (*b*), in the PAGE mode, an audio slot is preferentially allocated to the communication data of the sub station 200*a* for the manager. However, also in this case, the sub station for the store personnel 1, the sub station for the store personnel 2 and the other sub stations can make a call as with the case of the TALK mode, as far as an available slot can be allocated.

That is, in the wireless communication system 1 of this embodiment, the time division multiple access scheme is adopted for wireless communication between the center module 100 and the sub stations 200*a* to 200*g*. Accordingly, there is no case where only one sub station exclusively uses one channel. Therefore, even in a case of assigning a higher priority to the communication from the sub station 200*a* for the manager, the communication between the other sub stations is not terminated but is maintained. In the case of the PAGE mode, when an audio slot is available, another sub station can further make a call.

Also in a case where the PAGE mode is set by turning on the priority talk button 211 of the sub station 200*b* for the sub-manager, as with the above case, an audio slot is preferentially allocated to the communication data from the sub station 200*b* for the sub-manager, and the other sub stations can use the other available audio slots. In a case where any one of the sub station 200*a* for the manager and the sub station 200*b* for the sub-manager preferentially uses an audio slot in the PAGE mode, the other one of the sub station 200*a* for the manager and the sub station 200*b* for the sub-manager can make a call as far as an audio slot is available, as with the sub station 200*c* for the store personnel 1 and the sub station 200*d* for the store personnel 2.

As described above, in the wireless communication system 1 of this embodiment, the center module 100 selects the audio routing table according to the communication mode, and determines the sub station capable of outputting the communication data according to the attribute of the sub station based on the selected audio routing table. For instance, in the TALK mode, as with the above example, the controller 104 of the center module 100 reads from the memory 105 the audio routing table for the TALK mode shown in FIG. 8, and determines which receiving sub station is allowed to output the communication data, based on the audio routing table, according to if the calling sub station is the sub station 200*a* for the manager, the sub station 200*b* for the sub-manager, the sub station 200*c* for the store personnel 1, the sub station 200*d* for the store personnel 2, the sub station 200*e* for an outside line, the sub station 200*f* for the kitchen, or the sub station 200*g* for drive-thru.

The wireless communication system 1 of this embodiment adopts the time division multiple access/time division duplex scheme for wireless communication between the center module 100 and the sub stations 200*a* to 200*g*, allocates audio slots to the plurality of sub stations using one channel, and thereby transmits and receives the communication data of the sub stations at the same time. In particular, in the PAGE mode, an audio slot is preferentially allocated to the communication data of the specific sub station among the sub stations. Accordingly, the communication from the specific sub station to the other general sub stations can be secured, and the communication from the general sub stations can also be performed using the available audio slots at the same time. Thus, the priority communication from the specific sub station does not impede communication from the general sub station, while allowing the specific sub station to securely communicate with the other sub station. For instance, as described in the above example, an urgent call can securely be made from the manager to the other staff members, without impeding the communication between store personnel 1 and the store personnel 2 and the kitchen.

In the embodiment, during any one of the sub station 200*a* for the manager and the sub station 200*b* for the sub-manager is performing the priority communication, the other unit that is performing no priority communication can make a call as far as an audio slot is available, as with the cases of the sub station 200*c* for the store personnel 1 and the sub station 200*d* for the store personnel 2, but cannot acquire priority of allocating the audio slot. Instead, both the sub station 200*a* for the manager and the sub station 200*b* for the sub-manager may be allowed to perform priority communication at the same time. That is, in a case of including a plurality of specific sub stations, an audio slot may preferentially be allocated to the pieces of audio data of the respective specific sub stations at the same time.

In the embodiment, the sub station 200*a* for the manager and the sub station 200*b* for the sub-manager as the specific sub stations are provided with a priority talk button 211 which is not provided for the other sub stations. That is, at the shipment from the factory, it is distinguished whether the units are the specific sub stations or the sub stations 200*c* and 200*d* for store personnel as the general sub station. However, the present invention is not limited thereto. Every sub station which is a mobile intercom (in the embodiment, the sub stations 200*a* to 200*d*) may be provided with the priority talk button 211.

In this case, the center module 100 manages which sub station is set to the specific sub station, that is, which sub station is set such that the priority talk button 211 is enabled. More specifically, the center module 100 enables the priority talk button 211 of the sub station used by the manager or the sub-manager. For the sake thereof, the center module 100 is stored with the rewritable specific sub station management table. The specific sub station management table specifies whether the priority talk button is enabled in each sub station or not. When the center module 100 receives from the sub station the button state information indicating that the priority talk button is on along with the ID information of the sub station, this center module refers to the specific sub station management table and determines whether the priority talk button of the sub station is enabled or not. Only if the priority talk button of the sub station is enabled, the center module 100 switches the communication mode to the PAGE mode responsive to the button state information indicating that the priority talk button is on.

This configuration allows all the sub stations as the mobile intercoms to adopt the identical configuration, thereby enabling the manufacturing cost of this type of the sub station to be reduced. Further, this configuration can set which sub station is selected as the specific sub station from among the sub stations, as circumstances demand. For instance, when the sub-manager is absent, the sub stations for the store personnel 1 and 2 may be set as the specific sub stations. Further, a practice may be adopted according to which all the sub stations including the sub station for the sub-manager are set as the specific sub stations and then the sub stations for the staff members other than the manager and the sub-manager are allowed to perform a priority communication only in urgent case.

The specific sub station management table can be rewritten by the center module 100 (i.e. the specific sub station can be set by the center module 100). Instead, the sub station 200*a* for the manager is provided with an input section and the table can be rewritten by the sub station for the manager. In this case, the rewritten information is transmitted from the sub station 200*a* for the manager to the center module 100.

The audio routing table may be capable of being rewritten and/or added. In particular, as described above, in the case of allowing the plurality of sub stations to be arbitrarily set as the specific sub stations, the audio routing table is required to be rewritten or newly added according to the setting of the specific sub station. Also in the case where roles of the specific sub stations and the general sub stations are fixed, the audio routing can be changed or added by rewriting and adding the audio routing table, which is thus useful. Rewriting and addition of and to the audio routing table may directly be performed by the center module 100. Instead, the sub station 200*a* for the manager may be provided with the input section, which allows the sub station for the manager to perform rewriting and addition.

In the embodiment, in the PAGE mode, an audio slot is preferentially allocated to the specific sub station, and the preferential allocation is not performed on the other sub stations. However, the priority can be divided into a plurality of levels. For instance, gradual priorities may be defined on the sub station for the manager, the sub station for the sub-manager, the sub station for a leader store personnel, and the sub station for a general store personnel, in this sequence. In this case, when preferential allocations of the audio slot by the sub stations conflict in the PAGE mode, the slot is preferentially allocated to the sub station having a higher priority.

In this embodiment, the center module adopts the time division multiple access scheme, and, in the first communication mode, a part of slots are preferentially allocated to the communication data of the calling sub station according to the priority of the calling sub station. Accordingly, the center module can securely transmit the communication data of the sub station having a higher priority, and even the sub station having a lower priority can also communicate using another slot.

The preferred embodiment of the present invention that can be considered at the present time has been described above. However, various modifications can be made to this embodiment. It is intended that all the modifications within the true spirit and scope of the present invention be included in the appended claims.

Pursuant to the configuration of this embodiment, the center module adopts the time division multiple access scheme, and, in the first communication mode, preferentially allocates a slot to the communication data of the calling sub station according to the priority of the calling sub station. Therefore, the center module can securely transmit the communication data of the sub station having a higher priority, and the sub station having a lower priority can also communicate using another slot. Accordingly, for instance, in the case where the wireless communication system is applied to a restaurant, a party having authority (e.g. the manager of the restaurant) uses the sub station having a high priority and thereby, in the first communication mode, the communication data of the party having authority is preferentially transmitted to the other sub stations, while allowing the sub station used by the other parties (e.g. a store personnel of the restaurant) to make a call using an available slot at the same time.

Further, according to the configuration of this embodiment, in the second communication mode, slots can be allocated to the communication data of the sub station having a higher priority and also to the communication data of the sub station having a lower priority with the equivalent priority (without specific preference).

Moreover, according to the configuration of this embodiment, the center module can manage sub stations in a manner where the specific sub stations and the general sub stations are separated from each other, and, in the first communication mode, preferentially allocate a slot to the communication data of the specific sub station. For instance, in the case where the wireless communication system is applied to a restaurant, the sub stations used by parties having authority, such as the manager and the sub-manager, of the restaurant can be set as the specific sub stations having a higher priority, and the other sub stations (e.g. the sub stations used by the store personnel) can be the general sub stations having a lower priority.

Further, according to the configuration of this embodiment, the specific sub station provided with a high priority can instruct that the communication mode is set to the first communication mode and then the own communication data is preferentially transmitted from the center module to the sub station. Accordingly, the party having authority (e.g. the manager of the restaurant in the case where the wireless communication system is applied to the restaurant) uses the specific sub station and thereby the party having authority can forcedly make a call to the other sub stations (e.g. the store personnel of the restaurant in the case where the wireless communication system is applied to the restaurant).

Moreover, the configuration of this embodiment allows the specific sub station and the general sub station to have the identical configuration, and enables an arbitrary sub station to be selected as the specific sub station or the general sub station from among the plurality of sub stations.

Further, according to the configuration of this embodiment, the center module can manage priorities to be considered in the first communication mode, and the management can be realized by means of a simple method of determining the audio routing pursuant to the table.

Moreover, according to the configuration of this embodiment, rewriting of the audio routing table can set which sub station takes precedence over which sub station as circumstances demand. Accordingly, even in the case of arbitrarily setting whether each of the sub stations is to be the specific sub station or the general sub station as described above, the audio routing table according to which a slot is preferentially allocated to the communication data of the specific sub station in the first communication mode can be realized.

Moreover, the configuration of this embodiment allows the sub stations and the center module to communicate with each other using only one channel.

Also according to the configuration of this embodiment, the time division multiple access scheme is adopted, and, in the first communication mode, a slot is preferentially allocated to the communication data of the calling sub station pursuant to the priority of the calling sub station. This configuration allows the communication data of the sub station having a higher priority to be securely transmitted, and enables the sub station having a lower priority to communicate with each other using another slot.

Further, the configuration of this embodiment enables the sub station to instruct the center module to set the first communication mode.

Moreover, according to the configuration of this embodiment, the center module adopts the time division multiple access scheme, and a slot is preferentially allocated to the communication data of the calling sub station pursuant to the priority of the calling sub station in the first communication mode. This configuration allows the communication data of the sub station having the higher priority to be securely transmitted from the center module, and enables the sub station having the lower priority to communicate with each other using another slot.

What is claimed is:

1. A wireless communication system comprising a center module and a plurality of sub stations, the sub stations communicating with each other via the center module using a time division scheme, wherein
the wireless communication system has a first communication mode in which the center module allocates a slot to communication data of the sub station in a side of calling according to a priority of the calling sub station, and a second communication mode in which the center module allocates the slot to the communication data received from the calling sub station irrespective of the priority of the calling sub station, such that other sub stations among the plurality of sub stations can freely communicate using an available slot in both the first communication mode and the second communication mode,
the center module determines which sub station can make a call to which sub station,
each of the sub stations transmits identification information identifying itself along with the communication data to the center module, and
the center module identifies the transmitting sub station based on the identification information from the sub station, determines which sub station the identified sub station can make a call to, and allocates the slot to communication data between the sub station having been determined to be capable of making a call and the transmitting sub station.

2. The wireless communication system according to claim 1, wherein the sub station capable of making a call which is determined by the center module can be changed.

3. The wireless communication system according to claim 1, wherein the center module determines which sub station can make a call to which sub station in the first communication mode and the second communication mode.

4. The wireless communication system according to claim 1, wherein the center module determines which sub station can make a call to which sub station based on a plurality of attributes classified according to the identification information of the sub stations.

5. A wireless communication system comprising a center module and a plurality of sub stations, the sub station in a side of calling and the sub station in a side of receiving wirelessly communicating with each other via the center module,
wherein the calling sub station transmits communication data, and the center module receives the communication data transmitted from the calling sub station, allocates a slot to the communication data according to a set communication mode using a time division multiple access scheme, and transmits the communication data,
the receiving sub station receives the communication data transmitted from the center module, and reproduces the communication data,
the communication mode includes a first communication mode in which the center module allocates a slot to the communication data of the calling sub station according to a priority of the calling sub station, and a second communication mode in which the center module allocates the slot to the communication data received from the calling sub station irrespective of the priority of the calling sub station, such that other sub stations among the plurality of sub stations can freely communicate using an available slot in both the first communication mode and the second communication mode, and
the calling sub station transmits identification information identifying itself along with the communication data, and the center module has information that determines which sub station can make a call to which sub station for each of the first communication mode and the second communication mode, identifies the calling sub station having transmitted the communication data based on the identification information transmitted from the calling sub station along with the communication data, and allocates the slot to the communication data of the identified sub station according to the information that determines which sub station can make a call to which sub station pursuant to the set communication mode.

6. The wireless communication system according to claim 5, wherein the information that determines which sub station can make a call to which sub station has a format of an audio routing table.

7. The wireless communication system according to claim 6, wherein the audio routing table is rewritable.

8. The wireless communication system according to claim 1, wherein
the center module communicates with the sub stations by means of packets of the communication data using the time division scheme,
the packets include a plurality of slots, and
the center module allocates a part of the slots to communication data of the sub station which has higher priority and a rest of the slots are available to communication data of the sub station which has lower priority in the first communication mode.

9. The wireless communication system according to claim 5, wherein
the center module communicates with the sub stations by means of packets of the communication data using the time division scheme,
the packets include a plurality of slots,
the center module allocates a part of the slots to communication data of the sub station which has higher priority and a rest of the slots are available to communication data of the sub station which has lower priority in the first communication mode.

10. A wireless communication system comprising a center module and a plurality of sub stations, the sub stations communicating with each other via the center module using a time division scheme, wherein
the wireless communication system has a communication mode in which the center module allocates a slot to communication data of the sub station in a side of calling according to a priority of the calling sub station, such that other sub stations among the plurality of sub stations can freely communicate using an available slot in the communication mode,
the center module determines which sub station can make a call to which sub station,
each of the sub stations transmits identification information identifying itself along with the communication data to the center module, and
the center module identifies the transmitting sub station based on the identification information from the sub station, determines which sub station the identified sub station can make a call to, and allocates the slot to communication data between the sub station having been determined to be capable of making a call and the transmitting sub station.

11. The wireless communication system according to claim 10, wherein
the center module communicates with the sub stations by means of packets of the communication data using the time division scheme,
the packets include a plurality of slots,
the center module allocates at least a part of the slots to communication data of the sub station which has higher priority and a rest of the slots are available to communication data of the sub station which has lower priority in the communication mode.

12. The wireless communication system according to claim 11, wherein the center module allocates a part of the slots to downlink communication data of the sub station which has higher priority.

13. The wireless communication system according to claim 10,
wherein when an incoming external call is received, the communication data of the incoming external call is not output at the sub station which has a higher priority.

* * * * *